(12) United States Patent
Xia et al.

(10) Patent No.: US 10,528,742 B2
(45) Date of Patent: Jan. 7, 2020

(54) METHOD AND APPARATUS FOR REPAIRING KERNEL VULNERABILITY

(71) Applicant: BAIDU ONLINE NETWORK TECHNOLOGY (BEIJING) CO., LTD., Beijing (CN)

(72) Inventors: Liangzhao Xia, Beijing (CN); Longri Zheng, Beijing (CN); Yongqiang Lu, Beijing (CN); Chenfu Bao, Beijing (CN); Yulong Zhang, Beijing (CN); Tao Wei, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 201 days.

(21) Appl. No.: 15/619,023

(22) Filed: Jun. 9, 2017

(65) Prior Publication Data
US 2018/0165458 A1    Jun. 14, 2018

(30) Foreign Application Priority Data
Dec. 12, 2016    (CN) .......................... 2016 1 1139292

(51) Int. Cl.
*G06F 21/57*    (2013.01)
*G06F 9/445*    (2018.01)
*G06F 8/656*    (2018.01)

(52) U.S. Cl.
CPC ............ *G06F 21/577* (2013.01); *G06F 8/656* (2018.02); *G06F 9/445* (2013.01)

(58) Field of Classification Search
CPC .......... G06F 21/57; G06F 21/577; G06F 8/65; G06F 8/656; G06F 9/445
See application file for complete search history.

(56) References Cited

U.S. PATENT DOCUMENTS 9,477,461 B1    10/2016   Korotaev
9,772,928 B2 *   9/2017   Bhandari .............. G06F 11/366
(Continued)

FOREIGN PATENT DOCUMENTS

CN          105868639 A       8/2016

*Primary Examiner* — Joseph P Hirl
*Assistant Examiner* — Thomas A Gyorfi
(74) *Attorney, Agent, or Firm* — Lathrop Gage LLP

(57) ABSTRACT

The present disclosure discloses a method and an apparatus for repairing a kernel vulnerability. A specific implementation of the method comprises: collecting attribute information of a to-be-repaired kernel, the attribute information comprising feature information for representing a code loading mode supported by the to-be-repaired kernel; acquiring a vulnerability repairing code matching the feature information, the vulnerability repairing code being used for invoking a patch application programming interface, the patch application programming interface being used for adapting the vulnerability repairing code to kernel functions of different kernels; loading the vulnerability repairing code and relocating an instruction contained in the vulnerability repairing code; replacing an address relocated by the patch application programming interface in the vulnerability repairing code with an address of the kernel function invoked by the vulnerability repairing code; and executing the vulnerability repairing code with the replaced address to repair the kernel vulnerability.

15 Claims, 4 Drawing Sheets

(56) References Cited

U.S. PATENT DOCUMENTS

| | | | |
|---|---|---|---|
| 9,934,024 B2* | 4/2018 | Ashank | G06F 8/65 |
| 2010/0205587 A1 | 8/2010 | Dai et al. | |
| 2011/0271270 A1* | 11/2011 | Bowen | G06F 9/45558 |
| | | | 717/171 |
| 2015/0178071 A1* | 6/2015 | Pavlik | G06F 12/128 |
| | | | 717/168 |
| 2017/0010879 A1* | 1/2017 | Ashank | G06F 8/65 |

* cited by examiner

METHOD AND APPARATUS FOR REPAIRING KERNEL VULNERABILITY

CROSS-REFERENCE TO RELATED APPLICATION

This application is related to and claims priority from Chinese Application No. 201611139292.2, filed on Dec. 12, 2016 and entitled "Method and Apparatus for Repairing Kernel Vulnerability", the entire disclosure of which is hereby incorporated by reference.

TECHNICAL FIELD

The present disclosure relates to the field of computer technologies, particularly to the field of information security technologies, and more particularly to a method and an apparatus for repairing a kernel vulnerability.

BACKGROUND

As a core of an operating system, a kernel is in charge of managing system processes, memories, device drivers, files and network systems, and determines the performance and stability of the system. A kernel vulnerability repairing coding method by replacing the kernel and restarting the system cannot satisfy the requirement of high reliability. Therefore, a vulnerability repairing coding technology supporting the instant upgrading of a to-be-repaired kernel function in the kernel running process is needed. The existing kernel vulnerability hot repairing coding technology repairs the kernel function in the running process of the kernel in the form of memory vulnerability repairing code without replacing the whole kernel, which facilitates enhancing the reliability of the system.

Due to the fragmentation of kernels in Linux and other operating systems, definitions of the same struct and realized codes of the same function by different kernels may be different, and different compiling options may result in difference of the kernels, which poses a great challenge to the Linux kernel hot patching solutions. Currently, the hot patching solutions in the art need to compile source codes of a target kernel and repair codes to generate patches. Meanwhile, the patches are limited to be applied to only this target kernel. When the patches need to be applied to other kernels, recompiling is needed to generate new patches. When there are more versions of the kernels need to be repaired, a large amount of resources need to be expended.

SUMMARY

An objective of the present application is to propose an improved method for repairing a kernel vulnerability. The method comprises: collecting attribute information of a to-be-repaired kernel, the attribute information comprising feature information for representing a code loading mode supported by the to-be-repaired kernel; acquiring vulnerability repairing code matching the feature information, the vulnerability repairing code being used for invoking a patch application programming interface, the patch application programming interface being used for adapting the vulnerability repairing code to kernel functions of different kernels; loading the vulnerability repairing code and relocating an instruction contained in the vulnerability repairing code; replacing an address relocated by the patch application programming interface in the vulnerability repairing code with an address of the kernel function invoked by the vulnerability repairing code; and executing the vulnerability repairing code with the replaced address to repair the kernel vulnerability.

In some embodiments, the acquiring vulnerability repairing code matching the feature information comprises: acquiring the vulnerability repairing code stored in a server and matching the feature information, the server storing an identical vulnerability repairing code for different kernels.

In some embodiments, the feature information comprises system invocation information; and the acquiring vulnerability repairing code matching the feature information comprises: acquiring the vulnerability repairing code in a kernel module type matching the system invocation information.

In some embodiments, the feature information comprises physical memory device or kernel driver information; and the acquiring vulnerability repairing code matching the feature information comprises: acquiring the vulnerability repairing code in an instruction sequence type matching the physical memory device or kernel driver information.

In some embodiments, the loading the vulnerability repairing code and relocating an instruction contained in the vulnerability repairing code comprises: acquiring metadata information describing the to-be-repaired kernel; and relocating the instruction contained in the vulnerability repairing code and then loading the vulnerability repairing code, the vulnerability repairing code using the metadata information when being executed.

In some embodiments, the metadata information comprises at least one of: a kernel function name and address, a kernel variable name and address, a kernel struct name, a kernel struct address, a kernel struct member name, and a kernel struct member size.

In some embodiments, the acquiring metadata information describing the to-be-repaired kernel comprises: acquiring the metadata information saved in the kernel via the patch application programming interface; and/or acquiring the metadata information from a kernel image via the patch application programming interface, the kernel image being generated when the kernel compiles and containing each symbol definition and address; and/or downloading the metadata information by way of cloud.

In a second aspect, the present disclosure provides an apparatus for repairing a kernel vulnerability. The apparatus comprises: a collecting unit, configured to collect attribute information of a to-be-repaired kernel, the attribute information comprising feature information for representing a code loading mode supported by the to-be-repaired kernel; an acquiring unit, configured to acquire vulnerability repairing code matching the feature information, the vulnerability repairing code being used for invoking a patch application programming interface, the patch application programming interface being used for adapting the vulnerability repairing code to kernel functions of different kernels; a relocating unit, configured to load the vulnerability repairing code and relocate an instruction contained in the vulnerability repairing code; a replacing unit, configured to replace an address relocated by the patch application programming interface in the vulnerability repairing code with an address of the kernel function invoked by the vulnerability repairing code; and an executing unit, configured to execute the vulnerability repairing code with the replaced address to repair the kernel vulnerability.

In some embodiments, the acquiring unit is further configured to: acquire the vulnerability repairing code stored in a server and matching the feature information, the server storing an identical vulnerability repairing code for different kernels.

In some embodiments, the feature information comprises system invocation information; and the acquiring unit is further configured to: acquire the vulnerability repairing code in a kernel module type matching the system invocation information.

In some embodiments, the feature information comprises physical memory device or kernel driver information; and the acquiring unit is further configured to: acquire the vulnerability repairing code in an instruction sequence type matching the physical memory device or kernel driver information.

In some embodiments, the apparatus further comprises a metadata acquiring unit, configured to acquire metadata information describing the to-be-repaired kernel; wherein the relocating unit is further configured to relocate the instruction contained in the vulnerability repairing code and then load the vulnerability repairing code, the vulnerability repairing code using the metadata information when being executed.

In some embodiments, the metadata information comprises at least one of: a kernel function name and address, a kernel variable name and address, a kernel struct name, a kernel struct address, a kernel struct member name, and a kernel struct member size.

In some embodiments, the metadata acquiring unit is further configured to: acquire the metadata information saved in the kernel via the patch application programming interface; and/or acquire the metadata information from a kernel image via the patch application programming interface, the kernel image being generated when the kernel compiles and containing each symbol definition and address; and/or download the metadata information by way of cloud.

With the method and the apparatus for repairing a kernel vulnerability provided by the present disclosure, vulnerability repairing code matching the loading mode supported by the kernel is acquired, the vulnerability repairing code is relocated, an address relocated by a patch application programming interface in the vulnerability repairing code is replaced with an address of a kernel function invoked by the vulnerability repairing code, and then the vulnerability repairing code with the replaced address is executed so that the vulnerability repairing code with the replaced address can be loaded in the kernel to repair the vulnerability of the kernel. This vulnerability repairing method can be compatible with a plurality of methods for loading kernel repairing codes, independent of kernel source code and a kernel functionality thereof, allowing the vulnerability repairing code to be self-adapting to different kernel compiling versions, and overcoming the effect of the Linux system fragmentation.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
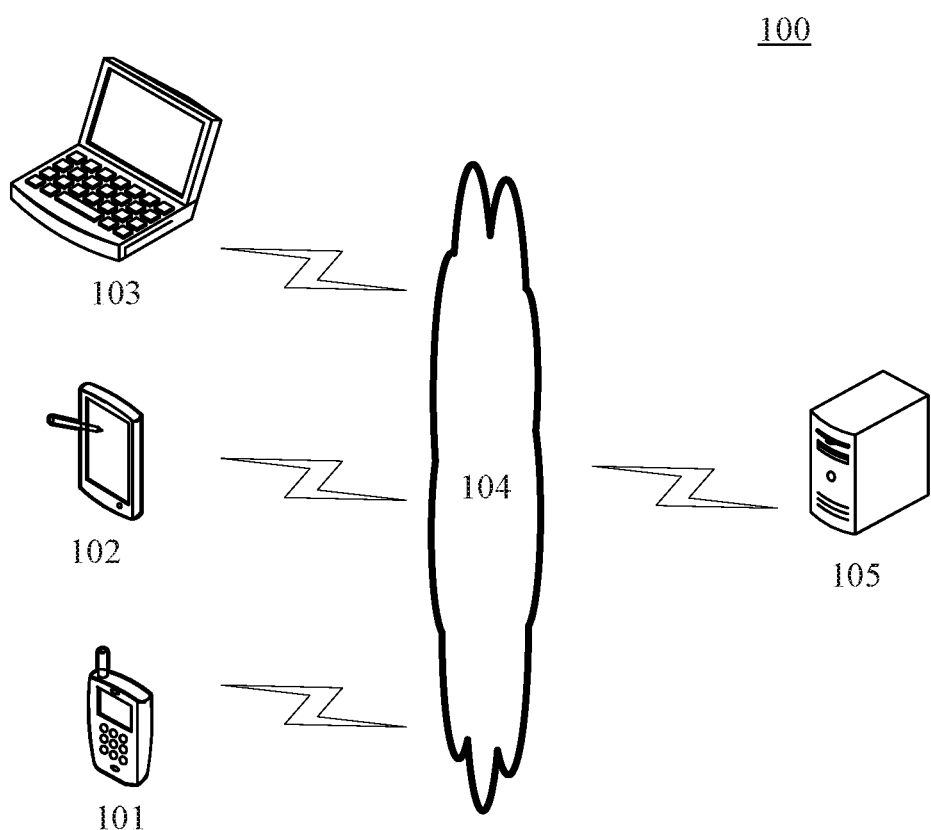
FIG. 1 is an exemplary architecture diagram of a system to which the present disclosure may be applied.

FIG. 1 shows an exemplary architecture of a system 100 to which the method or apparatus for repairing a kernel vulnerability according to embodiments of the present application may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless communication links, or optical fibers.

The user may use the terminal devices 101, 102 and 103 to interact with the server 105 through the network 104, in order to transmit or receive messages, etc. The terminal devices 101, 102 and 103 may be installed with a communication client application, such as safety software.

The terminal devices 101, 102, and 103 may be various electronic devices including, but not limited to, a smart phone, a tablet computer, an e-book reader, a Moving Picture Experts Group Audio Layer III (MP3) player, a Moving Picture Experts Group Audio Layer IV (MP4) player, a laptop portable computer, a desktop computer, and the like.

The server 105 may be a server providing various services, for example, a cloud server for providing a data support for the terminal devices 101, 102, and 103. The cloud server may perform processing, such as analysis, on the received vulnerability repairing code request data, and feed the processing result (for example, a preset vulnerability repairing code) back to the terminal devices 101, 102, and 103.

It should be noted that the method for repairing a kernel vulnerability according to the embodiments of the present application may be generally executed by the terminal devices 101, 102, or 103, and some steps may also be executed by the server 105. Accordingly, the apparatus for repairing a kernel vulnerability may be generally set in the terminal devices 101, 102, or 103, and some units thereof may also be set in the server 105.

It should be appreciated that the numbers of the terminal devices, the networks and the servers in FIG. 1 are merely illustrative. Any number of terminal devices, networks and servers may be provided based on the actual requirements.

Figure 2:
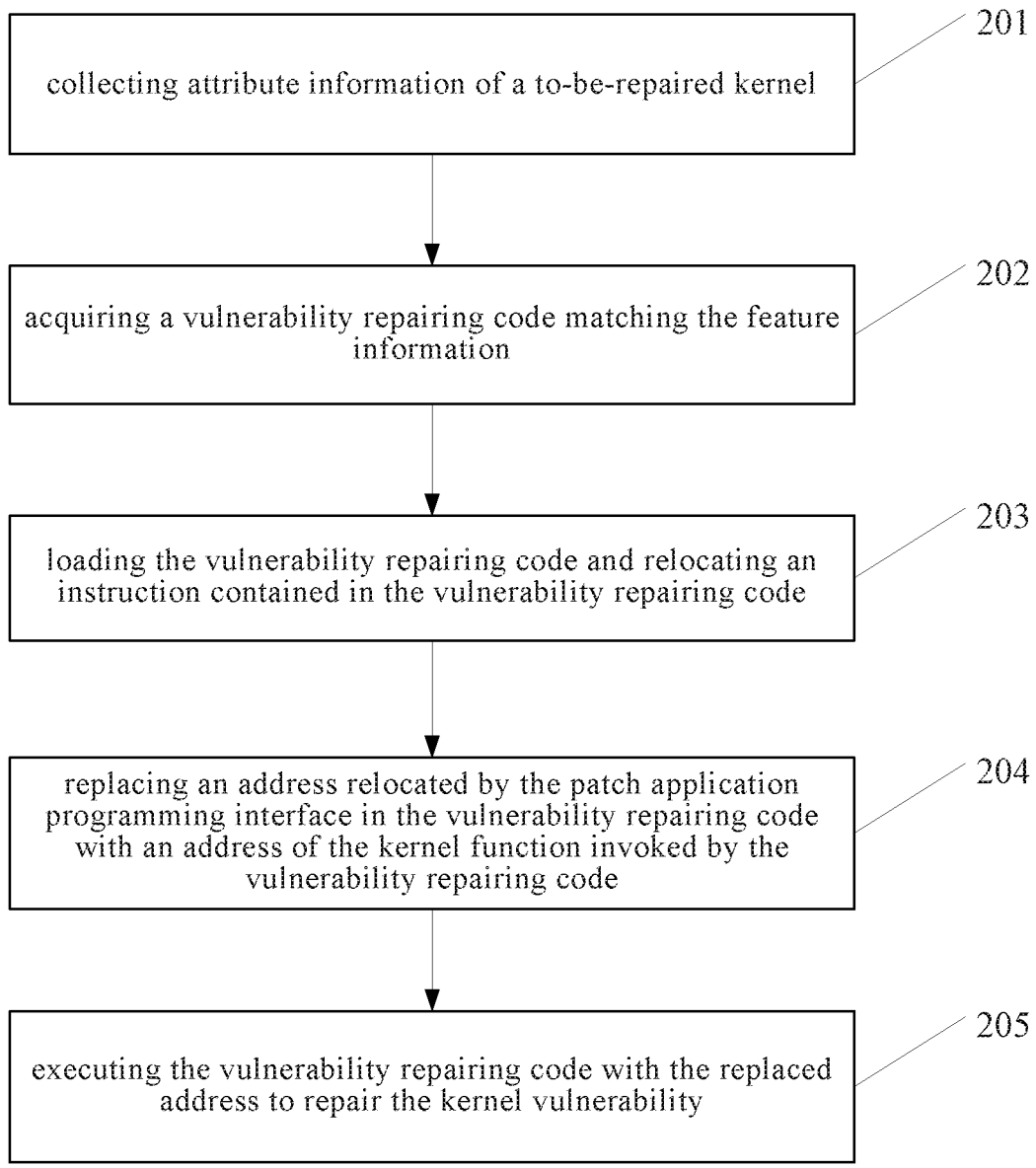
FIG. 2 is a flowchart of a method for repairing a kernel vulnerability according to an embodiment of the present disclosure.

Referring to FIG. 2, it illustrates a flow 200 of a method for repairing a kernel vulnerability according to an embodiment of the present disclosure. The method for repairing a kernel vulnerability comprises following steps.

Step 201: collecting attribute information of a to-be-repaired kernel.

In this embodiment, an electronic device (such as a terminal device as shown in FIG. 1) on which the method for repairing a kernel vulnerability runs may first analyze a to-be-repaired kernel in the electronic device to collect attribute information of the kernel. The to-be-repaired kernel may be a kernel of various operating systems such as Windows and Linux, etc. The attribute information may be various information for describing kernel-related attributes, for example, kernel version information and kernel configuration information, etc. The attribute information comprises feature information for representing a code loading mode supported by the to-be-repaired kernel. The feature information is information indicating that which mode is used by the to-be-repaired kernel to load the vulnerability repairing code. The feature information may comprise system invocation information indicating whether the to-be-repaired kernel supports the vulnerability repairing code loading a kernel module format, and/or physical memory device or kernel driver information indicating whether the to-be-repaired kernel supports the vulnerability repairing code loading an instruction sequence type. Code loading modes supported by different kernel compiling versions may likely be different. The code loading mode supported by the to-be-repaired kernel may be represented by means of the feature information. Code recording patterns may be various patterns for recording codes by the kernel, for example, kernel module loading modes, memory operating patterns and code loading modes likely supported by other systems.

In some optional implementations of this embodiment, the attribute information comprises at least one of: a repair state; a repair log; metadata information; system version information; system invocation information indicating whether the to-be-repaired kernel supports the vulnerability repairing code loading the kernel module format; physical memory device or kernel driver information indicating whether the to-be-repaired kernel supports the vulnerability repairing code loading the instruction sequence type; and kernel configuration information. The system invocation information and the physical memory device or kernel driver information are feature information.

Step 202: acquiring a vulnerability repairing code matching the feature information.

In this embodiment, the electronic device may acquire, from one or more preset vulnerability repairing codes, vulnerability repairing code matching the feature information. The vulnerability repairing code is used for invoking a patch application programming interface, and the patch application programming interface is used for adapting the vulnerability repairing code with kernel functions of different kernels. The kernel functions refer to functions positioned inside the operating systems and invoked only in kernel mode.

Generally, the one or more preset vulnerability repairing codes may be various vulnerability repairing codes for repairing the to-be-repaired kernel. The one or more preset vulnerability repairing codes may be stored in the electronic device locally or may be stored on the server and may be in various forms. The acquired vulnerability repairing code may be a kernel module form, or may be an instruction sequence form, or may be a predetermined instruction combination that can be interpreted and performed by the electronic device. The kernel module form refers to a group of target codes loaded into a kernel when the kernel runs, and the kernel does not need to be recompiled when reconstructing and using a loadable module. The matching relation between the vulnerability repairing code and the feature information may be preset. When acquiring the vulnerability repairing code, the electronic device may acquire the vulnerability repairing code matching the feature information according to the matching relation. For example, when the feature information indicates that the kernel supports to load code by the predetermined instruction combination, the matched vulnerability repairing code may be the corresponding instruction combination form.

In some optional implementations of this embodiment, the patch application programming interface is used for adapting the vulnerability repairing code with kernel functions of different kernels. The functionality of the patch application programming interface comprises but is not limited to: determining a function address (when compiling the vulnerability repairing code, each function has an entry address, which is a function address) of the vulnerability repairing code according to a kernel symbol name and/or an address (when compiling a kernel, each kernel function has an entry address, which is a kernel function address) of a kernel function invoked by the vulnerability repairing code; starting searching an instruction feature from the kernel function address to determine an instruction location contained in the vulnerability repairing code; writing data of a preset size into a designated address; modifying a to-be-repaired function by using vulnerability information (such as vulnerability function name and address, and vulnerability repair function address) provided in advance, and invoking the vulnerability repair function; acquiring offset of a kernel struct member; and acquiring a value of the kernel struct member. The patch application programming interface may limit a kernel difference within the patch application programming interface. For the vulnerability repairing code, the kernel difference is eliminated, and self-adaptivity of the vulnerability repairing code is enhanced.

In some optional implementations of this embodiment, Step 202 may specifically comprise: acquiring the vulnerability repairing code stored in a server and matching the feature information. The server stores identical vulnerability repairing code for different kernels. Therefore, a set of vulnerability repairing codes may be used in a plurality of kernels. For the same vulnerability, it is unnecessary to provide vulnerability repairing codes of different versions for different kernels. In this embodiment, the electronic device may acquire, from the server, the vulnerability repairing code matching the feature information by way of wired connection or wireless connection. The vulnerability repairing code stored in the server may be updated. Therefore, when acquiring the vulnerability repairing code, the electronic device may send a request to the vulnerability repairing code to the server, and the server may distribute a corresponding vulnerability code according to the request.

Optionally, the electronic device also may send corresponding attribute information to the server according to the request, so that the vulnerability repairing code returned by the server matches the feature information. The above wireless connection manner may comprise but not limited to 3G/4G connection, WiFi connection, Bluetooth connection, WiMAX connection, Zigbee connection, ultra wideband (UWB) connection and other present known or future developed wireless connection manners. By this means, the electronic device may acquire the vulnerability repairing code updated in real time, so that repairing the kernel vulnerability has stronger timeliness, thereby further ensuring the security of the kernel.

In some optional implementations of this embodiment, when the attribute information comprises the system invocation information, the vulnerability repairing code of a kernel module type matching the system invocation information is acquired.

In some optional implementations of this embodiment, when the attribute information comprises physical memory device or kernel driver information, the vulnerability repairing code of an instruction sequence type matching the physical memory device or kernel driver information is acquired.

The Linux operating system is taken as an example for description. For example, a certain kernel compiling version has preset system invocation information, which may be used for loading a kernel module. When the system invocation information is collected, this means that the kernel module may support loading of a kernel module, and the vulnerability repairing code of a kernel module type may be acquired when acquiring the vulnerability repairing code. The above preset system invocation may be module loading and unloading functions, for example, system invocation functions (such as init_module, finit_module, and delete_module) of a Linux system, or various other system invocations for loading or unloading the kernel module.

For another example, a certain kernel compiling version has preset physical memory device or kernel driver information, which may be used for memory operation to load and remove a code. When the physical memory device or kernel driver information is collected, this means that the kernel supports using the physical memory device or kernel driver for memory operation to load the code, and the acquired vulnerability repairing code may be an instruction sequence directly loaded for execution in the memory.

Optionally, when the system invocation and the physical memory device or kernel driver information are simultaneously collected, the vulnerability repairing code of the kernel module type matches the vulnerability repairing code of the instruction sequence type, and thus the electronic device may select either one.

Step 203: loading the vulnerability repairing code and relocating an instruction contained in the vulnerability repairing code.

In this embodiment, the vulnerability repairing code acquired in Step 202 is loaded, and the instruction contained in the vulnerability repairing code is relocated. Relocating is a process of transforming logical address space of a program into actual physical address space in the memory, namely, a process of modifying instructions and data in a target program when loading the vulnerability repairing code.

Step 204: replacing an address relocated by the patch application programming interface in the vulnerability repairing code with an address of the kernel function invoked by the vulnerability repairing code.

In this embodiment, the vulnerability repairing code is merely a reference of a patch application programming interface symbol, and is not operational. However, a realized function of the patch application programming interface has been present in the to-be-repaired kernel. Therefore, the address relocated by the patch application programming interface needs to be replaced with the address of the kernel function invoked by the vulnerability repairing code, so that the vulnerability repairing code with the replaced address may run.

Step 205: executing the vulnerability repairing code with the replaced address to repair the kernel vulnerability.

In this embodiment, the vulnerability repairing code with the replaced address may be executed to finish loading the vulnerability repairing code to repair the kernel vulnerability.

Using the method provided by the embodiment of the present disclosure, by loading the vulnerability repairing code composed of the patch application programming interface and self-adapting to different kernel versions, a kernel source code of the current operating system may be not dependent, thereby greatly reducing maintenance cost for the conventional hot patching technical solutions.

Figure 3:
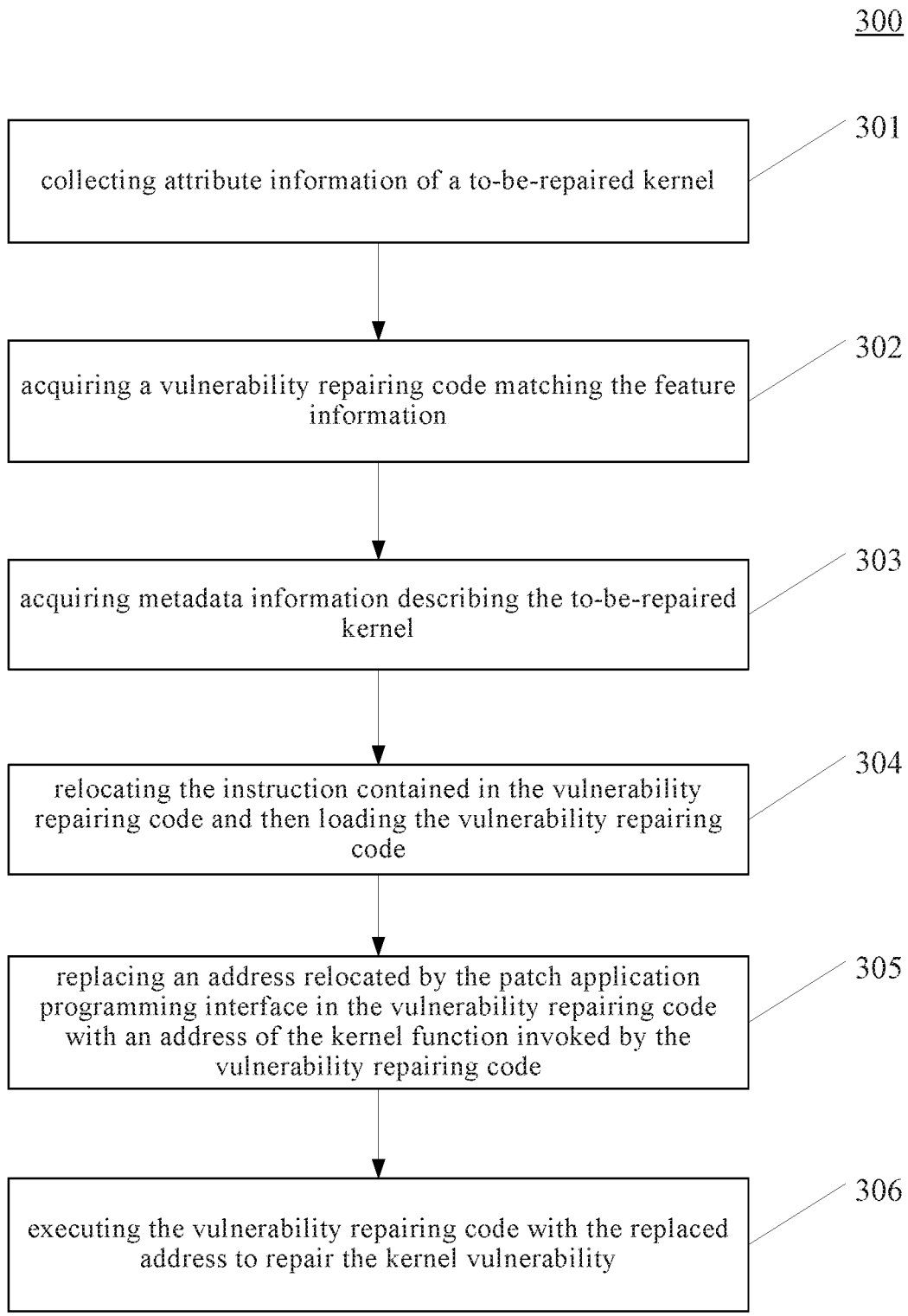
FIG. 3 is a flowchart of a method for repairing a kernel vulnerability according to another embodiment of the present disclosure.

Further referring to FIG. 3, which illustrates a flow 300 of a method for repairing a kernel vulnerability according to another embodiment. The flow 300 of the method for repairing a kernel vulnerability comprises following steps.

Step 301: collecting attribute information of a to-be-repaired kernel.

In this embodiment, specific processes in Step 301 may refer to Step 201 in the embodiment corresponding FIG. 2, and thus their detailed descriptions are omitted herein.

Step 302: acquiring vulnerability repairing code matching the feature information.

In this embodiment, specific processes in Step 302 may refer to Step 202 in the embodiment corresponding FIG. 2, and thus their detailed descriptions are omitted herein.

Step 303: acquiring metadata information describing the to-be-repaired kernel.

In this embodiment, the metadata information is used for describing particular information (such as offset of a certain kernel struct member, a certain kernel function address, a certain kernel variable address) of the kernel, and is used, as optional auxiliary conditions of the self-adapting vulnerability repairing code, for providing information required for the vulnerability repairing code. For example, in each kernel, the offset of a struct member in the struct may be different. To enable the vulnerability repairing code to be self-adapting to various kernels, the metadata information needs to be acquired in advance.

In some optional implementations of this embodiment, the metadata information comprises at least one of: a kernel function name and address, a kernel variable name and address, a kernel struct name, a kernel struct address, a kernel struct member name, and a kernel struct member size.

In some optional implementations of this embodiment, the acquiring metadata information describing the to-be-repaired kernel comprises: acquiring the metadata information saved in the kernel via the patch application programming interface; and/or acquiring the metadata information from a kernel image via the patch application programming interface, the kernel image being generated when the kernel compiles and containing each symbol definition and address; and/or downloading the metadata information by way of cloud. Downloading the metadata information by way of cloud refers to a fact that the metadata information may be combined with the vulnerability repairing code in cloud to generate a corresponding vulnerability repairing code for a certain designated kernel, and may be sent to the kernel along with the vulnerability repairing code.

Step 304: relocating the instruction contained in the vulnerability repairing code and then loading the vulnerability repairing code.

In this embodiment, the vulnerability repairing code is loaded after the instruction contained in the vulnerability repairing code is relocated according to the metadata information (such as the kernel function address, the kernel variable address, and the kernel struct) acquired in Step 303.

Step 305: replacing an address relocated by the patch application programming interface in the vulnerability repairing code with an address of the kernel function invoked by the vulnerability repairing code.

In this embodiment, specific processes in Step 305 may refer to Step 204 in the embodiment corresponding FIG. 2, and thus their detailed descriptions are omitted herein.

Step 306: executing the vulnerability repairing code with the replaced address to repair the kernel vulnerability.

In this embodiment, specific processes in Step 306 may refer to Step 205 in the embodiment corresponding FIG. 2, and thus their detailed descriptions are omitted herein.

As can be seen from FIG. 3, compared with the embodiment corresponding to FIG. 2, the flow 300 of the method for repairing a kernel vulnerability in this embodiment highlights the step of acquiring metadata information describing the to-be-repaired kernel, and each kernel may use the same vulnerability repairing code as long as the kernel can provide necessary metadata information, no modification being required.

Figure 4:
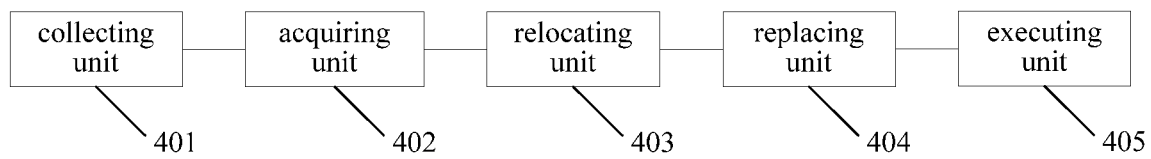
FIG. 4 is a schematic structural diagram of an apparatus for repairing a kernel vulnerability according to an embodiment of the present disclosure.

Further referring to FIG. 4, as an implementation of the method as shown in the foregoing figures, the present disclosure provides an embodiment of an apparatus for repairing a kernel vulnerability. The apparatus embodiment corresponds to the method embodiment as shown in FIG. 2, and the apparatus specifically may be used in various electronic devices.

As shown in FIG. 4, the apparatus 400 for repairing a kernel vulnerability according to this embodiment comprises: a collecting unit 401, an acquiring unit 402, a relocating unit 403, a replacing unit 404 and an executing unit 405. The collecting unit 401 is configured to collect attribute information of a to-be-repaired kernel, the attribute information comprising feature information for representing a code loading mode supported by the to-be-repaired kernel. The acquiring unit 402 is configured to acquire a vulnerability repairing code matching the feature information, the vulnerability repairing code being used for invoking a patch application programming interface, the patch application programming interface being used for adapting the vulnerability repairing code to kernel functions of different kernels. The relocating unit 403 is configured to load the vulnerability repairing code and relocate an instruction contained in the vulnerability repairing code. The replacing unit 404 is configured to replace an address relocated by the patch application programming interface in the vulnerability repairing code with an address of the kernel function invoked by the vulnerability repairing code. The executing unit 405 is configured to execute the vulnerability repairing code with the replaced address to repair the kernel vulnerability.

In this embodiment, specific processes of the collecting unit 401, the acquiring unit 402, the relocating unit 403, the replacing unit 404 and the executing unit 405 of the apparatus 400 for repairing a kernel vulnerability may refer to Step 201, Step 202, Step 203, Step 204 and Step 205 in corresponding embodiments of FIG. 2.

In some optional implementations of this embodiment, the acquiring unit 402 is further configured to acquire vulnerability repairing code stored in a server and matching the feature information, the server storing identical vulnerability repairing code for different kernels.

In some optional implementations of this embodiment, the feature information comprises system invocation information; and the acquiring unit 402 is further configured to acquire vulnerability repairing code in a kernel module type matching the system invocation information.

In some optional implementations of this embodiment, the feature information comprises physical memory device or kernel driver information; and the acquiring unit 402 is further configured to acquire vulnerability repairing code in an instruction sequence type matching the physical memory device or kernel driver information.

In some optional implementations of this embodiment, the apparatus 400 further comprises a metadata acquiring unit (not shown), configured to acquire metadata information describing the to-be-repaired kernel. The relocating unit 403 is further configured to relocate the instruction contained in the vulnerability repairing code and then load the vulnerability repairing code, the vulnerability repairing code using the metadata information when being executed.

In some optional implementations of this embodiment, the metadata information comprises at least one of: a kernel function name and address, a kernel variable name and address, a kernel struct name, a kernel struct address, a kernel struct member name, and a kernel struct member size.

In some optional implementations of this embodiment, the metadata acquiring unit is further configured to: acquire the metadata information saved in the kernel via the patch application programming interface; and/or acquire the metadata information from a kernel image via the patch application programming interface, the kernel image being generated when the kernel compiles and containing each symbol definition and address; and/or download the metadata information by way of cloud.

Figure 5:
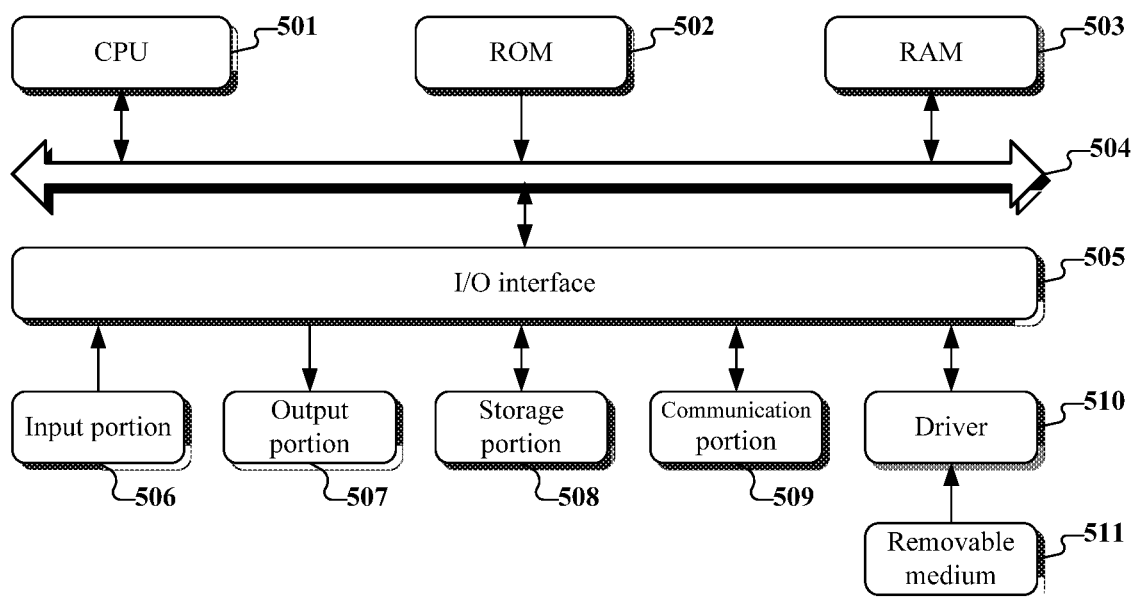
FIG. 5 illustrates a structural schematic diagram of a computer system adapted to implement a terminal device or a server of the embodiments of the present disclosure.

Referring to FIG. 5, a schematic structural diagram of a computer system 500 adapted to implement a terminal apparatus or a server of the embodiments of the present disclosure is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor, for example, described as: a processor, comprising a collecting unit, an acquiring unit, a relocating unit, a replacing unit and an executing unit. The names of these units or modules are not considered as a limitation to the units or modules. For example, the collecting unit may also be described as "a unit for collecting attribute information of a to-be-repaired kernel".

In another aspect, the present disclosure further provides a non-transitory computer storage medium. The non-transitory computer storage medium may be the non-transitory computer storage medium included in the apparatus in the above embodiments, or a stand-alone non-transitory computer storage medium which has not been assembled into a terminal. The non-transitory computer storage medium stores one or more programs. The one or more programs, when executed by a device, cause the device to: collect attribute information of a to-be-repaired kernel, the attribute information comprising feature information for representing a code loading mode supported by the to-be-repaired kernel; acquire a vulnerability repairing code matching the feature information, the vulnerability repairing code being used for invoking a patch application programming interface, the patch application programming interface being used for adapting the vulnerability repairing code to kernel functions of different kernels; load the vulnerability repairing code and relocate an instruction contained in the vulnerability repairing code; replace an address relocated by the patch application programming interface in the vulnerability repairing code with an address of the kernel function invoked by the vulnerability repairing code; and execute the vulnerability repairing code with the replaced address to repair the kernel vulnerability.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for repairing a kernel vulnerability, comprising:
   collecting attribute information of a to-be-repaired kernel, the attribute information comprising feature information for representing a code loading mode supported by the to-be-repaired kernel;
   acquiring vulnerability repairing code matching the feature information, the vulnerability repairing code being used for invoking a patch application programming interface, the patch application programming interface being used for adapting the vulnerability repairing code to kernel functions of different kernels;
   loading the vulnerability repairing code and relocating an instruction contained in the vulnerability repairing code;
   replacing an address relocated by the patch application programming interface in the vulnerability repairing code with an address of the kernel function invoked by the vulnerability repairing code; and
   executing the vulnerability repairing code with the replaced address to repair the kernel vulnerability.

2. The method according to claim 1, wherein the acquiring a vulnerability repairing code matching the feature information comprises:
   acquiring the vulnerability repairing code stored in a server and matching the feature information, the server storing an identical vulnerability repairing code for different kernels.

3. The method according to claim 1, wherein the feature information comprises system invocation information; and
   the acquiring a vulnerability repairing code matching the feature information comprises:
   acquiring the vulnerability repairing code in a kernel module type matching the system invocation information.

4. The method according to claim 1, wherein the feature information comprises physical memory device or kernel driver information; and
   the acquiring a vulnerability repairing code matching the feature information comprises:
   acquiring the vulnerability repairing code in an instruction sequence type matching the physical memory device or kernel driver information.

5. The method according to claim 1, wherein the loading the vulnerability repairing code and relocating an instruction contained in the vulnerability repairing code comprises:
   acquiring metadata information describing the to-be-repaired kernel; and
   relocating the instruction contained in the vulnerability repairing code and then loading the vulnerability repairing code, the vulnerability repairing code using the metadata information when being executed.

6. The method according to claim 5, wherein the metadata information comprises at least one of:
   a kernel function name and address, a kernel variable name and address, a kernel struct name, a kernel struct address, a kernel struct member name, and a kernel struct member size.

7. The method according to claim 5, wherein the acquiring metadata information describing the to-be-repaired kernel comprises:
- acquiring the metadata information saved in the kernel via the patch application programming interface; and/or
- acquiring the metadata information from a kernel image via the patch application programming interface, the kernel image being generated when the kernel compiles, and containing each symbol definition and address; and/or
- downloading the metadata information by way of cloud.

8. An apparatus for repairing a kernel vulnerability, comprising:
- at least one processor; and
- a memory storing instructions, which when executed by the at least one processor, cause the at least one processor to perform operations, the operations comprising:
- collecting attribute information of a to-be-repaired kernel, the attribute information comprising feature information for representing a code loading mode supported by the to-be-repaired kernel;
- acquiring vulnerability repairing code matching the feature information, the vulnerability repairing code being used for invoking a patch application programming interface, the patch application programming interface being used for adapting the vulnerability repairing code to kernel functions of different kernels;
- loading the vulnerability repairing code and relocating an instruction contained in the vulnerability repairing code;
- replacing an address relocated by the patch application programming interface in the vulnerability repairing code with an address of the kernel function invoked by the vulnerability repairing code; and
- executing the vulnerability repairing code with the replaced address to repair the kernel vulnerability.

9. The apparatus according to claim 8, wherein the acquiring vulnerability repairing code matching the feature information comprises:
- acquiring the vulnerability repairing code stored in a server and matching the feature information, the server storing an identical vulnerability repairing code for different kernels.

10. The apparatus according to claim 8, wherein the feature information comprises system invocation information; and
the acquiring vulnerability repairing code matching the feature information comprises:
- acquiring the vulnerability repairing code in a kernel module type matching the system invocation information.

11. The apparatus according to claim 8, wherein the feature information comprises physical memory device or kernel driver information; and
the acquiring vulnerability repairing code matching the feature information comprises:
- acquiring the vulnerability repairing code in an instruction sequence type matching the physical memory device or kernel driver information.

12. The apparatus according to claim 8, wherein the loading the vulnerability repairing code and relocating an instruction contained in the vulnerability repairing code comprises:
- acquiring metadata information describing the to-be-repaired kernel; and
- relocating the instruction contained in the vulnerability repairing code and then loading the vulnerability repairing code, the vulnerability repairing code using the metadata information when being executed.

13. The apparatus according to claim 12, wherein the metadata information comprises at least one of:
- a kernel function name and address, a kernel variable name and address, a kernel struct name, a kernel struct address, a kernel struct member name, and a kernel struct member size.

14. The apparatus according to claim 12, wherein the acquiring metadata information describing the to-be-repaired kernel comprises:
- acquiring the metadata information saved in the kernel via the patch application programming interface; and/or
- acquiring the metadata information from a kernel image via the patch application programming interface, the kernel image being generated when the kernel compiles and containing each symbol definition and address; and/or
- downloading the metadata information by way of cloud.

15. A non-transitory storage medium storing one or more programs, the one or more programs when executed by an apparatus, causing the apparatus to perform operations, the operations comprising:
- collecting attribute information of a to-be-repaired kernel, the attribute information comprising feature information for representing a code loading mode supported by the to-be-repaired kernel;
- acquiring vulnerability repairing code matching the feature information, the vulnerability repairing code being used for invoking a patch application programming interface, the patch application programming interface being used for adapting the vulnerability repairing code to kernel functions of different kernels;
- loading the vulnerability repairing code and relocating an instruction contained in the vulnerability repairing code;
- replacing an address relocated by the patch application programming interface in the vulnerability repairing code with an address of the kernel function invoked by the vulnerability repairing code; and
- executing the vulnerability repairing code with the replaced address to repair a kernel vulnerability.

\* \* \* \* \*